March 14, 1944.  E. B. ELLIOTT  2,343,963
STALK TOPPING AND DELEAFING MACHINE
Filed Sept. 12, 1940   3 Sheets-Sheet 1
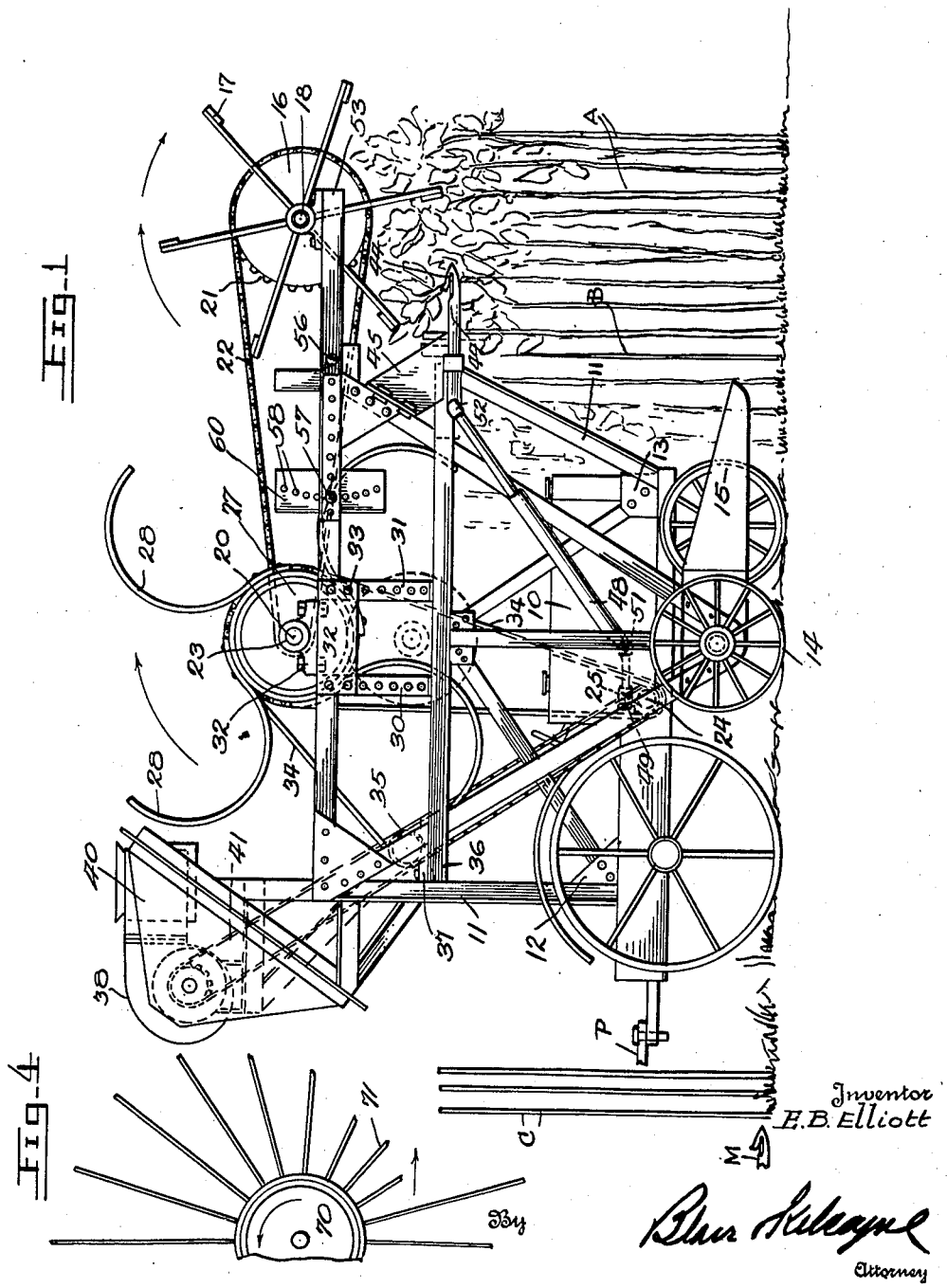

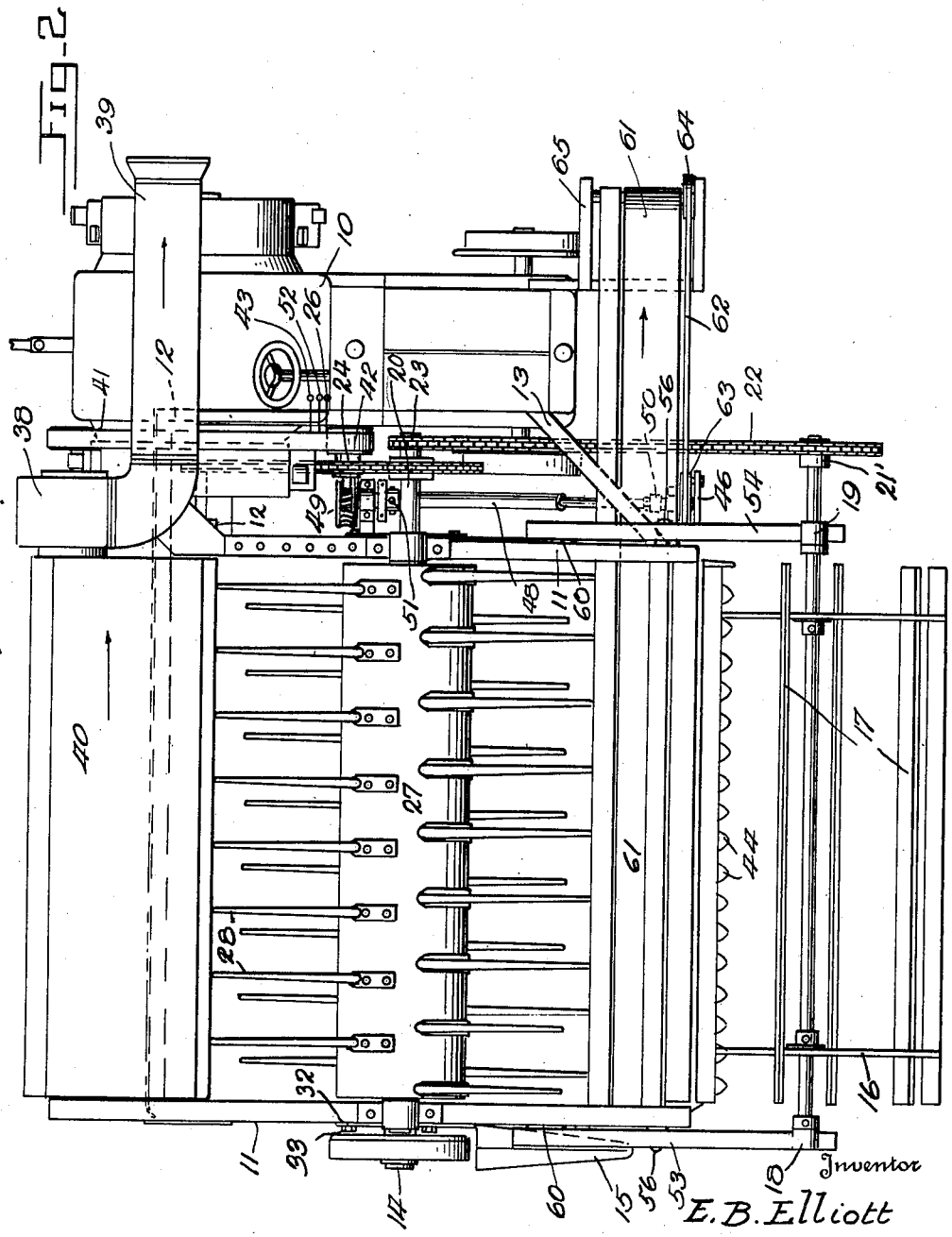

March 14, 1944.  E. B. ELLIOTT  2,343,963
STALK TOPPING AND DELEAFING MACHINE
Filed Sept. 12, 1940  3 Sheets-Sheet 3
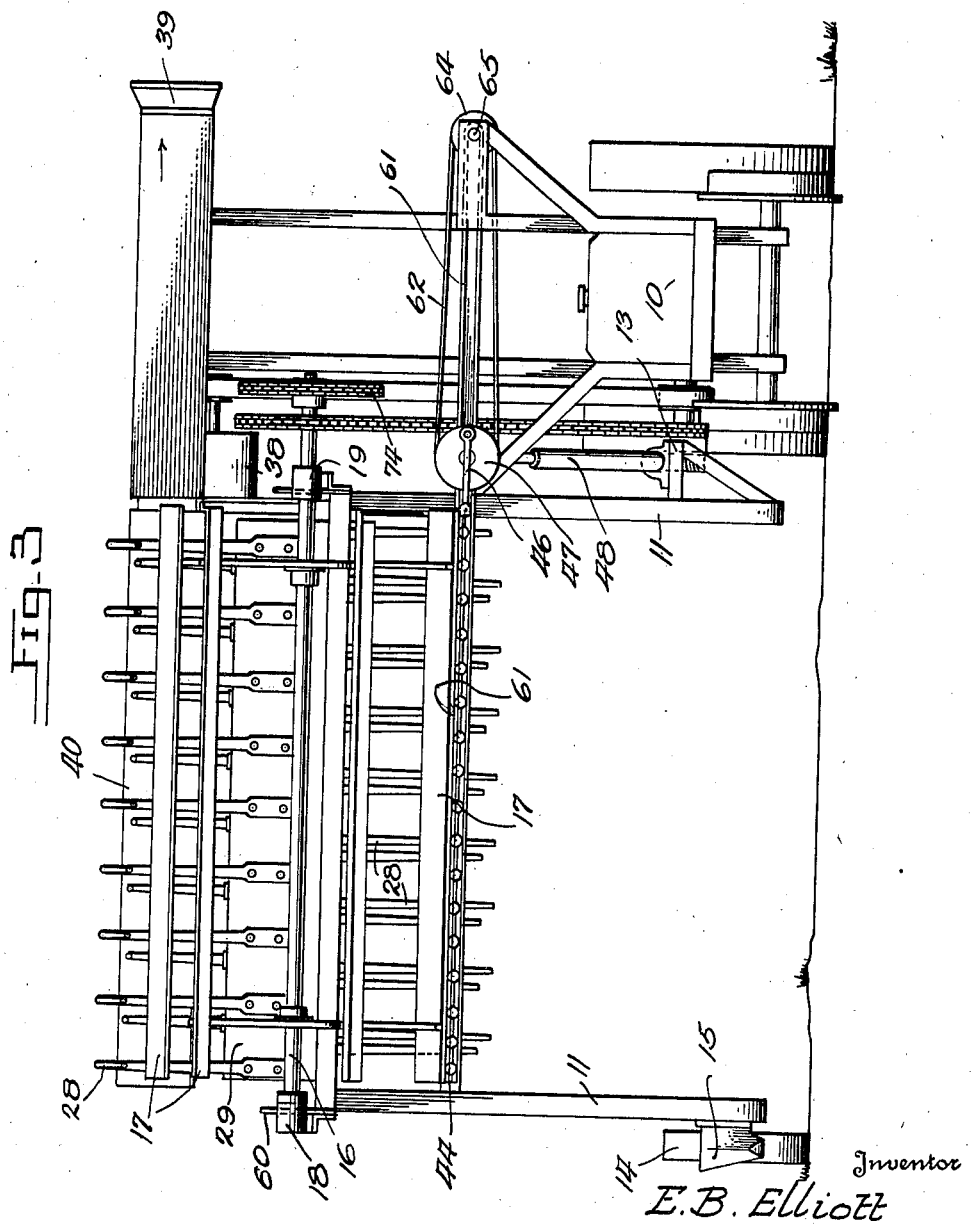
Inventor
E. B. Elliott

Patented Mar. 14, 1944

2,343,963

UNITED STATES PATENT OFFICE 2,343,963

STALK TOPPING AND DELEAFING MACHINE

Erwin Benham Elliott, Miami, Fla., assignor, by mesne assignments, to Reconstruction Finance Corporation, Jacksonville, Fla., a corporation of the United States Application September 12, 1940, Serial No. 356,551

6 Claims. (Cl. 56—17)

This invention relates to a machine especially adapted for topping and/or deleafing the stalks of plants. It is especially adapted for work on bast fiber stalks of the type generally known as "ramie." While many features of the invention are applicable for operation on other kinds of plants, the invention will be hereinafter described with particular relation to such operation.

As is well known to those familiar with ramie, the stalk, when ready for harvesting, averages about five feet in height, the upper part of which comprises a green "shoot" from which the smaller leaves extend, and for six or eight inches below this green shoot there are relatively small branches or leaf stems. The leaves and tops have no use, except possibly as fertilizer, and have to be removed before the stalk can be used in subsequent steps for recovering the bast fibers contained in the stalk. Also, these tops and leaves contain a large percentage of moisture which involves an unnecessary expense when handling and drying the stalk prior to decortication and should be removed for that reason as well.

Therefore, the present invention comprises a machine which will easily and quickly remove the tops and upper leaves of ramie stalks prior to their cutting, thus leaving the ramie stalks themselves of a convenient, uniform size, especially adapted to be harvested, bundled, dried, and subsequently treated.

One of the objects of the present invention is to provide a reliable and efficient machine which will remove the undesirable tops and leaves from the useable ramie stalk.

A further object of the invention is to provide a simple and practical machine which may be motivated by a tractor or the like through a field of ramie without substantial waste.

A further object is to provide a machine of the above character, which will remove the tops and/or leaves and discard them on the field, thereby to permit the leaves to rot and disintegrate, thus furnishing fertilizing matter for subsequent growth.

A further object is to provide a machine of the above character, with the parts so positioned and arranged with respect to the operator that the various parts or groups of elements, such as the topper, deleafer or cutter, may be under control at all times.

A further object is to provide a strong and durable machine of the above character having relatively few parts which may be conveniently assembled and manufactured.

A further object is to better prepare the ramie stalks for further handling and treatment by the removal of substantially half of the weight of the stalk constituted by the tops and leaves.

A further object is to quickly remove the leaves from the ramie stalks whereby the stalks may be more easily and quickly dried.

A further object is to provide an improved method of treating ramie stalks for subsequent handling, drying and processing.

Other objects will be in part obvious from the annexed drawings and in part hereinafter indicated in connection therewith by the following analysis of the invention.

This invention accordingly consists in the features of construction, combination of parts and in the unique relation of the members and in the relative proportioning and disposition thereof, all as more completely outlined herein.

To enable others skilled in the art fully to comprehend the underlying features of this invention, that they may embody the same by the numerous modifications in structure and relation contemplated by the invention, drawings depicting a preferred form of the invention have been annexed as part of this disclosure, and in such drawings like characters of reference denote corresponding parts throughout all of the views, in which—

Fig. 1 is a side elevation showing such parts of the complete machine as are necessary to understand the invention; also certain groups of stalks are shown in uncut condition, both before and after being operated upon;

Fig. 2 is a plan view of the machine shown in Fig. 1, some parts being shown diagrammatically;

Fig. 3 is a front elevational view of the parts shown in Fig. 1; and

Fig. 4 is a detail view of a modified form of deleafing drum.

Referring now more particularly to the drawings, especially Fig. 2, which is a plan view of the deleafing and stalk topping machine, this is shown as attached to and operated by a standard tractor 10 at one side. The machine includes a framework 11 attached to the tractor 10 at at least two points, such as 12 and 13. The overhanging weight of this frame is supported, if necessary at its outer end by a wheel 14 carrying a stalk divider 15 located at the desired elevated position in front of the wheel, as shown. This wheel may be omitted if the frame is counterbalanced for the wheel adds to the resistance encountered in traversing a field. The frame 11 supports at its forward part a drum 16 carrying blades 17 for operating on the tops of the stalks A, which drum revolves in bearings 18 and 19 and turns in the direction of the arrow. This is driven from a main drive shaft 20 on top of the frame through a driven sprocket 21. Power is transmitted through a chain or belt 22 and a small drive sprocket 23 which is belt or chain driven from a power take-off or a stub shaft 24 on the tractor 10 carrying a drive sprocket 25 with which is associated a clutch controlled by lever 26 in reach of the tractor operator, thereby to enable the mechanism to be started or stopped at will without interference with other moving mechanisms.

A second drum 27 has secured at equidistant points about its periphery and spaced as required to suit the distance apart of field planting a number of deleafing cutter prongs 28, also shown in Fig. 1, the purpose of which is to strip the leaves from topped stalks B while revolving and traveling forward with the tractor 10 through the field of standing ramie stalks. These prongs as shown are curved and sweep downwardly over the stalks. However, they work equally well if revolved in the opposite direction and are straight as shown in Fig. 4 instead of curved.

The depth on the stalk to which the leaves are to be removed and the varying heights of the stalks in the field are taken care of by raising or lowering the drum. This is accomplished by means of the drum assembly which includes vertically movable perforated plates 30 and 31. Bolts 33 (four in number) pass through holes in a base 32 in the frame 11 and are secured in any desired adjusted position for required results.

The tension of the main drive chain 34 is taken care of by an idler sprocket 35 which is movable horizontally along bar 36 extending fore and aft of the framework 11, and which sprocket is secured in proper position by bolting this base which supports the shaft and bearings in required adjusted position, as desired.

Leaves thus removed from stalks are carried rearwardly and then over the top of the tractor and are deposited on the ground which has already been mowed, to act as fertilizer. Such removal also avoids obstructing the mower (indicated at M) which follows the deleafer and may be pulled by the tractor. This removal of the leaves is accomplished by means of air currents which carry the leaves in the direction of an arrow in a duct 39, Fig. 2. The flow of air is maintained by an exhaust fan 38 secured to the frame 11, its inlet being attached to a hood 40 somewhat triangular in cross section. Rotation of the fan is accomplished by power through a belt 41 from a clutch pulley 42 on the main stub power shaft 34 and is started and stopped as desired by a standard clutch operating lever indicated diagrammatically at 43 on the tractor 10 without interfering with other moving mechanisms.

The whole leaf removal assembly is attached to and carried by the framework 11 (as shown in Figs. 1 and 2).

The topping mechanism as shown includes a cutter bar and reciprocating knives 44 of substantially conventional field or lawn construction provided they will accomplish the purpose of topping or cutting standing stalks A, as required, thus to remove the majority of leaves and small green shoots engaged by the reel arms 17. The average "cut off" is approximately six inches, as shown diagrammatically in Fig. 1.

The height of the cutter bar 44 is regulated by locating a movable plate 45 secured by bolts in desired position on an upright of the frame 11. These cutter knives are actuated by a pitman 46 and crank wheel 47 (Fig. 3) through a telescopic drive shaft 48 and worm gear 49 having universal joints 50 and 51, Fig. 2. This arrangement is suitable to transmit power from stub shaft 24 to the cutter knives 44 when in various positions. The lower end of this drive shaft adjacent the worm gear is provided with a clutch of the usual type operated by a lever 52 convenient to the driver of the tractor, all in a well known manner, and is used to engage and disengage the source of power to this assembly from the power take-off 24 on the tractor, as shown.

It is thus seen that the stalk tops are kept in desired position for cutting by the action of the revolving reel arms 17 supported at the outer ends of the pivoted arms 53 and 54 mounted on pivot pins 56. The height to which the stalks are topped is regulated by raising, lowering and anchoring these arms, which is accomplished by removal and insertion of pins 57 in holes 58 located in anchor plates 60 secured to the frame 11 in the desired adjusted position, as shown. Power is supplied to the reel through the chain or belt 22 and sprocket 21 as previously described, the latter being secured to the drum shaft 20.

Referring to Figs. 2 and 3, stalk tops and leaves as removed by the cutting blade 44 are deposited on the ground on the far side of the tractor by means of a conveyor belt 61 behind the cutter. The motion of this belt, being in the direction of the arrows, is obtained by means of a V-belt 62 and driving V-pulley 63 adjacent the crank disc 47 which passes around a driven roll 64 revolving and supported in suitable bearings 65. Power to the V-belt, as above stated, is obtained from the grooved crank wheel 47, and the desired speed is given conveyor belt 50 as the cutter is operated. To prevent the tops being thrown back and off of the conveyor belt 50, a deflecting board 66 is located at the rear of the belt in the position shown in Fig. 3 and is secured at proper points to the frame member 11 between the parts 45, Fig. 1.

The foregoing describes the essential parts of the machine sufficiently to enable one to understand the general construction and operation of the various parts. Some of the minor parts, such as the clutch and operating levers, are intentionally not shown in detail, as these are all well known elements, and their purpose, construction and operation are all familiar to one who has operated a tractor with attachments.

The operation of the machine will be more clearly understood by reference to Fig. 1. Here we have three groups of stalks indicated by the letters A, B and C, which show, respectively, the natural stalks in growth at A, the topped stalks at B, and the deleafed stalks at C. It is of course to be understood that these merely indicate certain groups of stalks diagrammatically. The entire field, however, is covered, like so much hay, only of course owing to the size of the stalks the number is materially less and the height much greater.

The tractor first moves along the edge of the field where ramie has not been planted or cultivated and the topper reel at the forward front edge is revolved sufficiently rapidly because the arms or blades 17 urge and hold the top of the stalks rearwardly in engagement with the cutter mechanism 44. The tops of these stalks fall back upon the conveyor belt 50 which carries the same to the far or right side of the tractor, as shown in Fig. 3. Immediately after the cutting action on the tops is completed, then the beater or deleafer arms 28 carried by the deleafer unit sweep downwardly into engagement with the tops of the stalks and bend the leaf stems downwardly and then upwardly carrying the detached leaves rearwardly to the air tunnel 40 as shown clearly in Fig. 1. The suction applied to this air tunnel draws the leaves transversely of the machine and discharges them out on the far side of the tractor, as shown in Fig. 2.

As previously explained, the beater arms 28 may be raised and lowered. Likewise the cutter blade may be shifted according to the height of the crop which, of course, varies in different localities, according to climatic conditions, or perhaps to the extent fertilizer has been used on the field.

Reference is made to Fig. 4 of the drawings showing a slight modification of the deleafing drum 70 which is preferably of the closed type and provided with radially projecting straight arms or prongs 71. This drum is driven in a counterclockwise direction, as compared to the drum shown in Fig. 1, and when operated in this manner the drum is lowered to a position where its axis is substantially at the same height as the topped stalks. Thus the drum tends to bend the stalks forwardly as the attachment is moved over the field, and the deleafing arms or prongs 71 have a relatively upward sweeping movement with respect to the stalks, thereby to strip the leaves with a combing action. When the machine is operated in this manner, of course the blower is not used and the leaves are scattered in every direction but fall relatively evenly over the field without causing trouble of any kind.

When a cutter M of the usual harvester-binder type is pulled by the tractor by bar or coupling P, as indicated in Fig. 1, then the cutter blades are in a position to cut the stalks C immediately above the ground and they fall back upon the reaper conveyor in a well known manner. As this mechanism has no part in the present invention, except in so far as it may enter into certain combinations, a detailed description thereof is unnecessary.

It is thus seen that the present invention is of a simple and practical character, which may be inexpensively manufactured, assembled and operated with a high degree of efficiency.

Without further analysis the foregoing will so fully reveal the gist of this invention that others can, by applying current knowledge, readily adapt it for various applications without omitting certain features that from the standpoint of the prior art, fairly constitute essential characteristics of the generic or specific aspects of the invention, and therefore such adaptations should and are intended to be comprehended within the meaning and range of equivalency of the following claims.

I claim:

1. A machine for acting on and removing the tops and upper leaves of ramie stalks and the like comprising, in combination, a tractor, a laterally extending horizontal shaft protruding to one side of the upper part of the tractor and near the normal level of the tops of the stalks, a drum mounted upon said shaft having radially extending beater arms adapted to move downwardly and rearwardly with respect to the forward travel of the tractor whereby as said drum passes over the tops of the stalks they are bent downwardly and rearwardly, and means driven by the tractor for rotating the drum whereby said beater arms comb and whip the tops and upper leaves of the stalks to remove the foliage therefrom without injury to the body of the stalks.

2. In a machine as set forth in claim 1, in which said beater arms rotate to have a relatively upward movement with respect to the stalks after engagement therewith.

3. In a machine as set forth in claim 1, in which said drum is positioned to engage the tops of the stalks and rotate to cause the arms to sweep in the direction of the length of the stalks.

4. In a machine as set forth in claim 1, including a transverse reel positioned ahead of said drum and substantially parallel thereto and means for adjusting said reel vertically depending upon the height of the stalks.

5. In a machine of the character set forth in claim 1 including a cutting mechanism mounted upon the frame in advance of said drum for removing the extreme tops of the stalks as the tractor moves forwardly.

6. In a machine as set forth in claim 1, including a cutting mechanism mounted on the frame adjacent said drum for removing the extreme tops of the stalks and a reel in advance of the cutting and slightly thereabove for urging the tops of the stalks towards said cutter.

ERWIN BENHAM ELLIOTT.